United States Patent Office 3,058,520
Patented Oct. 16, 1962

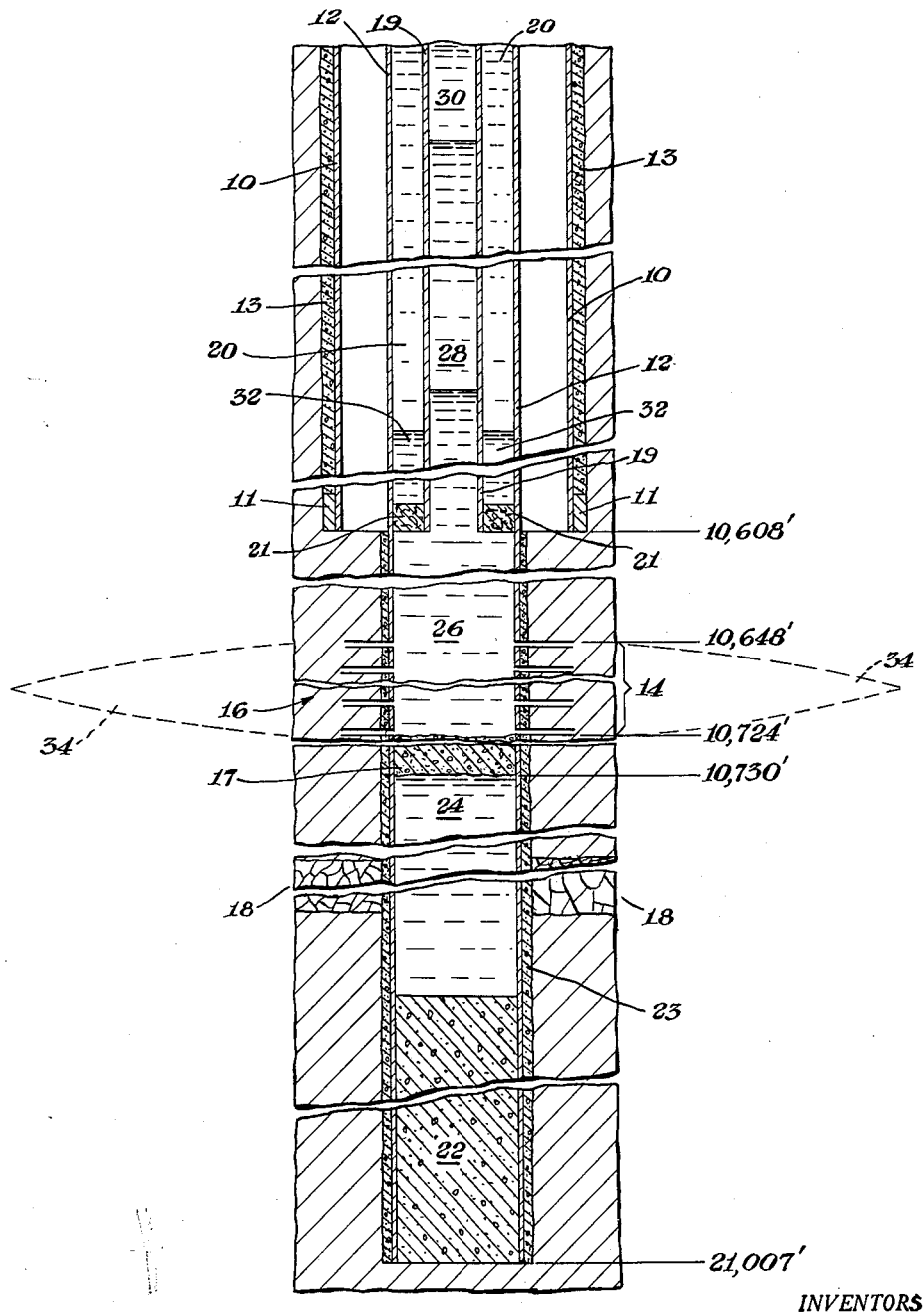

3,058,520
COMPOSITION OF HYDRAULIC CEMENT AND POLYVINYL ACETATE AND USE THEREOF
George W. Woodard and George H. Merkle, Tulsa, Okla., assignors to The Dow Chemical Company, Midland, Mich., a corporation of Delaware
Filed July 24, 1958, Ser. No. 750,628
4 Claims. (Cl. 166—31)

The invention is concerned with well cementing. It is primarily concerned with an improved well-cementing composition and method of cementing wells.

The obtainment of minerals in fluid form from the earth's crust is beset with a number of problems many of which are of a complex nature: after rights of exploration and drilling are ascertained, a fluid-bearing source must be located; a hole must be drilled into the earth's crust to tap the source and a casing be secured in position therein to prevent sloughing of the borehole wall; a string of tubing and usually a pumping system must be provided to bring the fluid to the surface; the flow of fluid therefrom must be maintained at a sufficiently high rate and for a sufficiently long period of time to make the venture economically feasible. These problems are particularly challenging in the production of crude petroleum and natural gas. New compositions and methods that increase rate of flow, insure longer producing life, or prevent contamination of the fluid sought to be produced from intruding fluids and dislodged earthen material have high utility.

The demand for gas and petroleum products is steadily increasing. As a result thereof, drilling operations have expanded into increasingly remote areas and difficultly accessible terrain which in turn has created more complex problems: the holes are deeper; they are often drilled under lakes, oceans, marshes or jungles, through shallower largely depleted oil strata, and through shifting unconsolidated sands and/or fresh water or brine-producing zones which are not sealed off from the gas or petroleum-producing zones or from the wellbore and, therefore, continue, after completion of the well, to introduce unwanted fluids, e.g., water and brine, which also often are accompanied by detritus and float sand, into the petroleum or gas zone thereby impairing the quality and reducing the production or cutting it off altogether.

Segregating or sealing off the gas- and petroleum-producing zones from zones which introduce unwanted fluids together with unconsolidated formation material continually presents new problems as additional wells are drilled into differenet formations.

A slurry consisting of Portland cement and water has extensively been used to seal off troublesome zones and thereby prevent communication thereof with the producing zones of the formation. The troublesome zone or zones may be at the bottom of the well or they may be at any level which has communicating channels leading into the petroleum- or gas-producing zone or into the wellbore directly. The usual practice, is to inject an hydraulic cement (neat cement) slurry into the well, usually between the well casing and the wall of the wellbore, at the level of the troublesome zones or at the bottom of the wellbore below the casing if a seal is desired there.

Although a slurry of hydraulic cement and water has been of value in sealing off unwanted fluids from gas- and petroleum-producing zones, its use has presented a number of problems because it is lacking in certain properties that are desirable in such a well-cementing composition. Among the properties which an hydraulic cement-water slurry lack are: ability to bond to the earthen wall of the hole; compatability with residual slurry, mud, or brine in the wellbore or in the zone to be cemented; resistance of loss of water into the formation when the slurry is subjected to the pressure necessary to force it into place, such loss of water often resulting in premature setting as well as failure to be properly placed. The set cement also lacks shatter resistance whenever perforations are attempted through such set cement.

These and other deficiencies of an hydraulic cement-water slurry have given rise to a need for a better cementing material and method of sealing off wells. In U.S. Patent 2,819,239 to Ebehard et al. there is described a cementing composition and method of making and method of using such a cement composition in wells which offer a number of advantages over theretofore known compositions and methods employing such compositions in which an hydraulic cement is an ingredient. Among such advantages are increased bonding strength, lower filtration loss, increased tolerance to drilling muds, increased resistance to attack by sulfates in ground water, and greater resistance of the set cement to shattering and cracking during subsequent perforations of well casing. However, under high mechanical shear at elevated temperatures, the cement of U.S. Patent 2,819,239 has tended to thicken prematurely and therefore has required special care in the use thereof.

The principal object of the present invention is to provide a cementing composition and method of using such composition which retains essentially all the meritorious properties of the cement of U.S. Patent 2,819,239, but in addition thereto, has greater controlled thickening time and provides improved workability during its preparation and injection into the well.

The improved cementing composition and the method of preparing and method of using such composition according to the invention will be made clear in the ensuing description and is defined in the appended claims.

The improved well-cementing composition of the invention consists essentially of an aqueous slurry of an hydraulic cement and a polyvinyl acetate polymer latex. Wetting, antifoaming, and antifreeze agents may be admixed therewith, if desired, to impart properties peculiar to the presence of such additives. The dispersant preferred is a non-ionic surfactant, e.g., octyphenol or di-secondary-butylphenol condensed with an average of 10 or 12 moles of ethylene oxide.

The drawing is a schematic representation of an oil well during that stage of squeeze cementing a well according to the method of the invention which exists just after the hydraulic cement-polyvinyl acetate slurry has been pumped into the well tubing but prior to its injection through perforations in the casing at the zone of intruding fluids. The location of the squeeze cement positioned in the intrusion zone is suggested by a broken line.

Referring to the drawing in greater detail there are shown surface casing 10 extending to casing shoe 11 at a depth of 10,608 feet and interior thereto casing 12 extending from ground level to a depth of 21,007 feet. Set cement poured at the time casing 10 was set in the well is shown in item 13. Casing 12 shows perforations 14 therein opening into intrusion zone 16 between the levels of 10,648 and 10,724 feet. A short distance below intrusion zone 16 in the wellbore at a level of 10,730 feet is bridge plug 17 positioned therein as a preparatory step in cementing off zone 16 in accordance with the invention. Below plug 17 is shown pay zone 18. Tubing 19 extends to a depth a short distance above perforations 14, and together with casing 12 defines annulus 20 therebetween. Packer 21 is shown in position at the lower end of tubing 19 in annulus 20. In the lower part of casing 12 there is shown set cement 22 from a prior cementing job. The space between the wellbore wall and casing 12 contains cement 23 positioned there when the casing was placed in the well. Below 17 is drilling mud 24 above which is water 26. Above 26, which follows water 26 into the formation during the cementing operation, is cement-latex slurry composition 28 of the invention. Item 30 is the first portion of flush water which follows the slurry during the cementing operation. Item 32 represents a small amount of water allowed to enter annulus 20 before packer 21 was set to aid in holding the packer in place.

Item 34 shown by a dotted outline represents the suggested position of pancake-like cement composition of the invention after it is positioned in the well at the close of the treatment.

To prepare the composition of the invention, an hydraulic cement is admixed with a plyvinyl acetate emulsion latex. The practice of the invention requires only the hydraulic cement, the polyvinyl acetate latex, and water. Usually the latex is first diluted with water before admixing it with the hydraulic cement. The preferred practice of the invention is to admix a small amount of a dispersant with the diluted latex prior to admixing it with the hydraulic cement. A small amount of an antifoaming agent and/or an antifreeze agent may be advantageously added to the latex admixture thus made with agitation. For convenience, they are usually added prior to admixing with the hydraulic cement. Mixing is continued for from 10 to 40 minutes or until a substantially homogeneous mixture is obtained. Any suitable mixing apparatus provided with adequate stirring is satisfactory for preparing the composition of the invention.

Table I below sets out the operable and the preferred limits of the ingredients of the composition of the invention in parts by weight based upon 100 parts of an hydraulic cement.

*Table I*

| Ingredients | Operable limits | Preferred limits |
|---|---|---|
| Essential ingredients: | | |
| Hydraulic cement | 100 | 100 |
| Water | 32–72 | 40–58 |
| Latex solids | 2.5–25 | 3–15 |
| Optional additives: | | |
| Wetting agent (surfactant) | 0.2–1.5 | 0.3–1.0 |
| Antifreeze agent | 0.25–1.6 | 0.5–1.0 |
| Antifoaming agent | 0.01–0.1 | 0.015–0.075 |

The latex is an aqueous emulsion or suspension system comprising homopolymer particles varying from 0.3 to 10 microns but usually between 1 and 5 microns in diameter. The percent latex solids are generally between 50 and 60 percent by weight of the emulsion, about 55 percent being most common. The viscosity at 25° C. may be between 600 and 3000 centipoises but is more commonly between 1200 and 1800 centipoises. The specific gravity at 25° C. is usually about 1.1, the weight per gallon therefore being about 9.2 pounds. Methods of preparing polyvinyl acetate emulsions or suspensions are well known. The monomer requires the presence of a protective colloid to prevent hydration during the early stages of the polymerization. To prevent this hydration, 1 to 5 percent of polyvinyl alcohol as a protective colloid is usually added. A method of preparing a polyvinyl acetate emulsion consists essentially of admixing the ingredients set out in the recipe in Table II below.

*Table II*

Ingredients: Parts by weight
Emulsifier to reduce surface tension _____ 0.40
Polyvinyl alcohol _____ 1.25
$K_2S_2O_4$ _____ 0.10
$NaHCO_3$ _____ 0.05
Vinyl acetate _____ 55.00
Water sufficient to make 100.00.

Usually part of the water is placed in a glass-lined kettle under reflux provided with continuous agitation and a heating means. To the water are admixed the polyvinyl alcohol, $K_2S_2O_8$ (the initiator or catalyst), $NaHCO_3$ (as a buffer), and a small part of the vinyl acetate, say 5 parts by weight. The kettle is heated and when the temperature reaches about 70° C., polymerization begins. The balance of the water is usually added at this time and when the temperature is about 72° C. the balance of the vinyl acetate is admixed gradually. The temperature is held below 90° C. Polymerization is usually completed after about 2 hours. A branched and cross-linked polymer is obtained by this method which imparts added toughness to the latex particles when dry. If desired, a comparatively large amount of polyvinyl alcohol may be employed to form a polymer containing substantial amounts of polyvinyl alcohol that serve as a sort of nuclei in the polymer.

The emulsifier employed in the preparation of polyvinyl acetate latex is preferably of the anionic type surfactant. Anionic surfactants contain a predominant negative ionizable group which will migrate in a solution containing an anode or positive pole, toward such pole. A particularly satisfactory surfactant of the anionic type employed is of the alkylaryl sulfonate class. Other examples of anionic surfactants are (1) fatty acid, rosin acid, and naphthenic acid soaps, (2) sulfated ethers and amides, (3) sulfonated esters and amides, and (4) sulfated oils and esters. Nonionic surfactants may be employed in the production of polyvinyl acetate latices, however, either singly or in conjunction with anionic. Non-ionic surfactants do not contain an ionizable group and have no electrical charge in the polymerizable mixture. Examples of non-ionic surfactants are (1) alkyl and alkylaryl ethers and thioethers and (2) esters and amides and, more specifically, the condensation product of ethylene oxide and octyl phenol mentioned above. Generally speaking, an emulsifier useful in preparing the polyvinyl acetate should reduce the surface tension of water from between 72 and 30 dynes per centimeter at a concentration of less than 0.01 percent. It must produce relatively large and stable micelles and be unreactive with the ingredients in the monomeric and polymerizing mixture.

The hydraulic cement employed may be any of the cements referred to as Portland cement or aluminous cement. For example, A.S.T.M. Types I, II, III, and IV designated C–150 to C–152, respectively, part III pages 1–5 of A.S.T.M. Standards (1952) may be employed in the invention.

Latex-cement compositions useful in cementing off zones in a formation traversed by a well and useful in positioning casing in wells according to the invention, together with compression strength values, are set out in Tables III, IV, V, VI and VII. In preparing the composition of Table III, polyvinyl acetate latex was diluted with water and Portland cement added particularly slowly thereto to obtain a smooth slurry. In preparing the composition of Table IV, a dispersant was admixed with the diluted latex prior to admixing with Portland cement. In preparing the compositions of Tables V, VI and VII, both an antifoam and antifreeze agent as well as a dispersant were admixed with the diluted latex prior to admixing with Portland cement. The Portland cement was added relatively rapidly in the presence of the dispersant showing the beneficial effect of presence thereof.

The compression strength was determined according to the procedure set out in A.S.T.M. Standards, part III, pages 119–125, Designation C–109–52 entitled "Compression Strength of Hydraulic Cement Mortars."

The tables show both the parts by weight of the ingredients based on 100 parts by weight of Portland cement and the percentage composition by weight of the slurry and of the set or dry latex-Portland cement composition.

Table III

| Ingredients | Parts by weight of slurry based on 100 parts dry Portland cement | Percentage composition of— | | Compression strength p.s.i. | |
|---|---|---|---|---|---|
| | | Slurry | Set cement composition | 80° F. | 120° F. |
| Portland cement ASTM Type I | 100.00 | 66.29 | 95.96 | | |
| Polyvinyl acetate emulsion | [1] 7.09 | [2] 4.71 | 4.04 | | |
| Water | 46.60 | 29.00 | | | |
| | 153.69 | 100.00 | 100.00 | 1,002 | 2,700 |

[1] Consisting of 55 percent latex solids.
[2] Since the latex consisted of 55 percent latex solids, the latex solids added were 2.59 percent of the slurry and there was added by way of the latex 2.12 percent of water, making a total of 31.127 percent water present.

An examination of Table III shows that a cement of high compression strength can be made employing an hydraulic cement, polyvinyl acetate latex, and water according to the invention.

Table IV

| Ingredients | Parts by weight of slurry based on 100 parts dry Portland cement | Percentage composition of— | | Compression strength p.s.i. | |
|---|---|---|---|---|---|
| | | Slurry | Set cement composition | 80° F. | 120° F. |
| Portland cement ASTM Type I | 100.00 | 66.20 | 92.96 | | |
| Polyvinyl acetate emulsion | [1] 7.10 | [2] 4.70 | 6.60 | | |
| Polyglycol (dispersant) | 0.30 | 0.30 | 0.44 | | |
| Water | | 29.80 | | | |
| | 107.40 | 100.00 | 100.00 | 995 | 2,720 |

[1] Consisting of 55 percent latex solids.
[2] Since the latex consisted of 55 percent latex solids, the latex solids added were 2.58 percent of the slurry and there was added by way of the latex 2.13 percent of water making a total of 31.93 percent water present.

An examination of Table IV shows that a dispersant may be employed in the practice of the invention to facilitate the mixing thereof without appreciable effect upon the compression strength of the composition thus prepared.

Table V

| Ingredients | Amount in pounds | Parts by weight of slurry based on 100 parts dry Portland cement | Percentage composition of— | | Compression strength p.s.i. | |
|---|---|---|---|---|---|---|
| | | | Slurry | Set cement composition | 80° F. | 120° F. |
| Portland cement ASTM Type I | [1] 1,034 | 100.00 | 66.15 | 92.24 | | |
| Polyvinyl acetate emulsion | 73.3 | [2] 7.09 | [3] 4.69 | 5.54 | | |
| Ethylene glycol | 9.0 | 0.87 | 0.57 | 0.80 | | |
| Wetting agent (polyglycol) | 4.5 | 0.44 | 0.28 | 0.40 | | |
| Antifoam agent (silicon type) | 0.2 | 0.02 | 0.01 | 0.02 | | |
| Water added | 442.0 | 42.74 | 28.30 | | | |
| Total weight | 1,563.0 | 151.16 | 100.00 | 100.00 | 989 | 2,666 |
| Water added plus water from latex | 482.6 | 45.93 | 30.41 | | | |
| Total solids weight (without water) | 1,121 | | | | | |

[1] 11 sacks.
[2] Consisting of 55 percent latex solids.
[3] Since the latex was 55 percent solids (contained 45 percent water) water in the amount of 2.11 percent by weight of the slurry were added by the latex making a total of 30.41 percent water.

Table V shows that the dispersant, an antifoaming agent, and antifreeze agent may be present in the composition of the invention without adversely affecting the composition's compression strength.

Additional compositions according to the invention were made to ascertain the effect of varying the amount of water in the latex-cement composition of the invention. The latex-cement slurry compositions were prepared wherein the ingredients were admixed in the same amounts in each of the compositions as in those shown in Table V except that the percentage of water was varied. A compression strength was run on each of the compositions thus prepared. The ingredients in the compositions and the compression strength after 24 hours setting time at 80° F. are shown in Table VI below. The results obtained in Table V are repeated in Table VI for ready comparison.

Table VI

| Ingredients | Amt. in lbs. | Parts by weight based on 100 parts by weight of any cement | Percentage composition of slurry | Compression strength, p.s.i. |
|---|---|---|---|---|
| Portland cement | 1,034 | 100.00 | 73.15 | 2,348 |
| PVA emulsion [1] | 73.3 | [2] 7.09 | [3] 2.86 | |
| Ethylene glycol | 9.0 | 0.87 | 0.65 | |
| Polyglycol | 4.5 | 0.44 | 0.33 | |
| Antifoamer | 0.2 | 0.02 | 0.01 | |
| Water added | 292.0 | 28.24 | | |
| Total weight | 1,413.0 | 136.66 | | |
| Water added plus water from latex | 325.0 | 31.34 | 23.00 | |
| | | | 100.00 | |
| Water added [4] | 442 | 42.74 | 28.30 | 989 |
| Water added plus water from latex [4] | 482.6 | 45.93 | 30.41 | |
| Portland cement | 1,034.0 | 100.00 | 56.50 | 305 |
| PVA emulsion [1] | 73.3 | [2] 7.09 | [3] 2.20 | |
| Ethylene glycol | 9.0 | 0.87 | 0.46 | |
| Polyglycol | 4.5 | 0.44 | 0.23 | |
| Antifoamer | 0.2 | 0.02 | 0.01 | |
| Water added | 708.0 | 68.50 | | |
| Total weight | 1,829.0 | 176.92 | | |
| Water added plus water from latex | 741.0 | 71.70 | 40.60 | |
| | | | 100.00 | |

[1] PVA = Polyvinyl acetate emulsion, 55 percent total solids.
[2] Solids only equal 3.9.  [3] Solids only.
[4] Same as Table V.

The slurries prepared according to the invention as shown by Table VI were readily pumpable and retained their fluid properties for a sufficiently long period to be injected into a well and positioned therein in a well-cementing operation. The compression tests of the compositions, as set out in Table VI, show that between 31.43 and 71.7 parts by weight of water based on 100 parts by weight of dry Portland cement containing 3.9 parts by weight of polyvinyl acetate latex solids are sufficiently high for well cementing operation. When less than about 32.0 parts water, based on 100 parts by weight of hydraulic cement (about 23 percent), was used, the slurry composition was too thick to be readily pumped.

When more than about 72 parts by weight (about 40.6 percent) water were used, the slurry tended to stratify and become non-homogeneous. However, the higher proportions of water tend to lower the compression strength and the lower proportions tend to unduly thicken the slurry. It is recommended that the water be between 40 and 58 parts based on 100 parts by weight of dry cement. A series of runs was made to show the effect on compression strength of the set cement latex composition of the invention which resulted when the amount of latex solids was varied in the composition. The amount of ethylene glycol added was increased proportionately to the latex solids present to maintain the ratio of Table V and the amount of water added was decreased as the latex was increased because with the increased latex solids a measurable amount of water was added. The total amount of water was held about 30.4 percent of the wet composition or slurry. In runs 1, 6 and 8 no latex was used. These runs were for comparison purposes. Runs 2 to 5, 7 and 9 illustrate the practice of the invention. The results obtained by increasing the latex solids from 0 to 5.6 percent by weight at 80°, and 2.6 percent at 120° and 200° F. are set out in Table VII below.

Table VII

| Run | Latex solids by weight | Setting temp. °F. | 24 hour compression strength, p.s.i. |
|---|---|---|---|
| 1 | 0.1 | 80 | 1,195 |
| 2 | 0.7 | 80 | 1,015 |
| 3 | 1.4 | 80 | 1,020 |
| 4 | 2.6 | 80 | 989 |
| 5 | 5.6 | 80 | 895 |
| 6 | 0 | 120 | 4,652 |
| 7 | 2.6 | 120 | 2,666 |
| 8 | 0 | 200 | 2,254 |
| 9 | 2.6 | 200 | 1,146 |

An examination of Table VII shows that the compression strength after a setting period of 24 hours at 80° F. for each amount of latex solids used was but little less than when only Portland cement was used. The table shows that at advanced temperatures, the compression strength of the latex-Portland cement composition of the invention was considerably less than that of Portland cement alone. However, the compression strength was still sufficiently high for well cementing operations.

Another series of runs was made in which the amount of a wetting agent was employed in varying amounts. The composition of the latex-cement slurry was the same as that given in Table V except a different wetting agent was used. The wetting agent in this series of runs consisted of the condensation product prepared by condensing di-secondary-butylphenol and ethylene oxide in a molar ratio of 1 of the di-secondary phenol to 10 of the ethylene oxide. The ingredients were added to the mixer within a short time without particular precautions to prevent lumping. Compression strengths were run on each of the samples after a 24 hour drying time at 80° F. The results are set out in Table VIII below.

Table VIII

| Runs | Amount of wetting agent (percent by volume) | Compression strength after 24 hours at 80° F. (p.s.i.) |
|---|---|---|
| 10 | <0.2 | (¹) |
| 11 | 0.2 | 695 |
| 12 | 0.5 | 950 |
| 13 | 1.0 | 890 |
| 14 | 2.0 | 910 |
| 15 | 4.0 | 885 |

¹ Latex coagulated and did not mix in properly.

An examination of the results set out in Table VIII shows that at least 0.2 percent wetting agent is required to disperse the latex smoothly unless the ingredients are added slowly accompanied by especial stirring precautions to prevent lumping. Further examination shows that but little improvement in compression strength resulted when more than 0.5 percent wetting agent was employed but no appreciable adverse effect could be seen by employing as much as 4 percent.

A further series of runs was made for the purpose of comparing the fluid loss of cement slurries prepared according to the invention and those prepared according to U.S. Patent 2,819,239. The fluid loss was determined according to the American Petroleum Institute Standard Field Procedure for Testing Drilling Fluids (tentative) API RP 29, 3rd Edition (May, 1950). The slurry composition prepared according to the invention was that set out in Table V above. The composition prepared according to U.S. Patent 2,819,239 consisted of a substantially homogeneous mixture of: 55 gallons of water, 0.5 gallon of octylphenol condensed with 10 moles of ethylene oxide, 6.7 gallons of an internally plasticized vinylchloride copolymer emulsion, and 0.8 gallon of ethylene glycol admixed with 1034 pounds (11 sacks) of Portland cement, ASTM Type I. A comparison of the results of the fluid loss is determinable by referring to Table IX below.

Table IX

| Runs | Latex cement composition according to— | Mixing time minutes | Temp. °F | Fluid loss in 30 minutes API RP 29, ml. |
|---|---|---|---|---|
| 16 | Table V above | 5 | 80 | 21 |
| 17 | U.S. Pat. 2,819,239 | 5 | 80 | 15 |
| 18 | Table V above | 45 | 120 | 20 |
| 19 | U.S. Pat. 2,819,239 | ¹ 29 | 120 | ² 1,000 |
| 20 | Table V above | 100 | 150 | 25 |

¹ Latex-cement became excessively thick and was barely pumpable: the fluid loss values, therefore, could not be accurately determined.
² Extrapolated.

A further series consisting of runs 21, 22, and 23 was made to show the workability of the latex-cement composition of the invention in comparison with conventional neat Portland cement and with the improved latex-Portland cement composition of U.S. Patent 2,819,239. The test of workability of the cementing composition was carried out in accordance with Schedule 5 of the American Petroleum Institute Recommended Practice for Testing Oil Well Cements API RP 10B, 5th Edition (May 1956). The test simulates a cementing operation of an 8000 foot well having a bottom hole temperature of 125° F. Briefly the test comprises subjecting the cement slurry to increments of pressure and temperature for 55 minutes and then holding the cement slurry at these conditions with agitation until the viscosity reaches 100 poises. This viscosity is used because a higher viscosity is considered too thick to pump. The results of the test are stated as "thickening time" which is the length of time which elapses between the beginning of the pressure and temperature increments and the time the viscosity is 100 poises. The neat Portland cement composition, run 21, consisted of 100 grams of Portland cement ASTM Type I and 46 grams of water. The latex-Portland cement composition of U.S. Patent 2,819,239 was that set out in the paragraph preceding Table IX above. The polyvinyl acetate-latex-Portland cement slurry of the invention was that set out in Table V above.

Table X

| Run | Cement composition | Thickening time, minutes |
|---|---|---|
| 21 | Neat-Portland cement | 122 |
| 22 | Latex-cement of U.S. Pat. 2,819,239 | 69 |
| 23 | Polyvinyl acetate-cement of invention | 110 |

The results of the thickening tests set out in Table X show that the latex-cement composition of the invention was about 0.9 that of neat cement whereas the latex-cement composition of U.S. Patent 2,819,239, had a thickening time which was less than 0.6 that of neat cement.

An example of cementing an oil well according to the invention is as follows:

*Stage 1.*—A 400-gallon batch of the polyvinyl acetate latex-cement slurry of the invention was prepared by admixing 212 gallons of water, 36.5 gallons of a polyvinyl acetate emulsion (55 percent total solids having a particle size between 1 and 5 microns), 1.9 gallons of di-secbutylphenol condensed with 10 moles of ethylene oxide, and 1.4 quarts of silicone type antifoamer in a 500-gallon paddle mixer and continuing to mix for 15 minutes. Then 4512 pounds (48 sacks) of Portland cement were added slowly to the contents to the paddle mixer and stirring continued for a period of 30 minutes.

An oil well in the Headlee Pool, Ector County, Texas, which is shown schematically in the drawing was selected to be cemented according to the invention. Zone 18 at a level of about 11,000 feet in a Pennsylvania stratum was producing in a unitized field. It was desired to cement off a Devonian stratum at a level of between 10,648 and 10,724 to which reference is made as intrusion zone 16. It was necessary that a squeeze cement job be able to withstand a pressure of about 7000 p.s.i. Preparatory to cementing off according to the invention, bridge plug 17 was positioned in the well as shown and perforations 14 made through casing 12 at the intrusion zone. Packer 21 was positioned in an open condition, not as shown, in annulus 20. Drilling mud 24 resting on cement 22 from a previous cementing job was in the wellbore at the start of the cementing operation. To begin the treatment of the well, ten barrels of water were first pumped down tubing 19, two barrels of which, indicated by numeral 32, were forced up into annulus 20 before closing packer 21, and eight barrels remained above the level of drilling mud 24 in casing 12 and in tubing 19. The 400 gallons (9.5 barrels) of latex-cement composition 28 prepared as described in the paragraph above, were then pumped down tubing 19 followed by twenty barrels of flush water 30. The pressure in casing 12 at the well head was raised to 1800 p.s.i., the pump stopped, and the pressure held here for about 10 minutes and then raised to 4800 p.s.i. to force the latex-cement composition through perforations 14 and against the area of the formation into the area designated 34, defined by a dotted outline. The pressure, however, bled off slowly indicating that there had not been a complete sealing off of the formation.

*Stage 2.*—A 500-gallon batch of the latex-cement composition was made up of the same proportions used in the 400-gallon batch prepared and used in Stage 1. This 500-gallon batch was forced into the well and flushed back into the formation similar to the procedure used in Stage 1 except that the final pressure was 5800 p.s.i. The pressure did not hold but slowly bled off indicating again that a complete seal in the formation had not yet been accomplished.

*Stage 3.*—A 250-gallon batch of latex cement composition was made following the procedure used in Stages 1 and 2 except that the final injection pressure was raised to 7000 p.s.i. When the pump was stopped the pressure did not drop, that is, there was no bleeding off into the formation thus showing that a good seal had been made. The pressure was released and bridge plug 17 drilled out. The well was then put back into production, producing fluids only from below the 11,000 foot level.

The polyvinyl acetate-hydraulic cement composition of the invention offers a number of advantages over neat-hydraulic cement now employed in oil well cementing. The cement composition of the invention bonds to oil or brine-wet walls, or walls having a sheath of residual drilling mud adhering thereto; it tolerates relatively large amounts of contaminants such as mud, when set, it is resistant to shattering during subsequent perforations of the casing; it is more resistant generally to chemical attack by dissolved materials in the oil and water, e.g., sulfur compounds.

The polyvinylacetate-hydraulic cement of the invention offers the advantages of greater workability and greater permissible time between mixing and placing in the well over the latex-cement composition of U.S. Patent 2,819,239. A particularly important advantage of the composition of the invention over other cementing compositions including that of U.S. Patent 2,819,239 is the improved fluid loss control thereover at elevated temperatures.

Having described the invention, what is claimed and desired to be protected by Letters Patent is:

1. The process of cementing a well traversing an earthen formation wihch comprises positioning therein a settable slurry comprising by weight 100 parts of Portland cement, between 2.5 and 25 parts of polyvinyl acetate latex solids, and between 35 and 65 parts of water.

2. The process of cementing off intruding fluids from fluids sought to be produced from an earthen formation traversed by a well which consists of cementing off said intruding fluids from access to the fluids sought to be produced by positioning at the place of intrusion a settable slurry consisting essentially by weight of 100 parts of Portland cement, between 2.5 and 25 parts of polyvinyl acetate latex solids, between 0.2 and 1.5 parts of a nonionic surfactant, and between 35 and 65 parts of water.

3. The process of cementing off intruding fluids from fluids sought to be produced from an earthen formation traversed by a well which consists of cementing off said intruding fluids from access to the fluids sought to be produced by injecting at a pressure greater than that exerted by the intruding fluids at the place of intrusion a settable slurry consisting essentially of a mixture of 100 parts of Portland cement, between 40 and 58 parts of water, between 3 and 15 parts of polyvinyl acetate latex solids, up to 1 part of an antifreeze agent, and up to 0.075 part of an antifoaming agent.

4. The process of claim 2 wherein said settable slurry is prepared by admixing said non-ionic surfactant with an aqueous emulsion of said polyvinyl acetate, said emulsion comprising between 50 and 60 percent total latex solids having a particle size of between 1 and 5 microns in diameter, and admixing the so treated emulsion with said cement.

References Cited in the file of this patent

UNITED STATES PATENTS

| | | |
|---|---|---|
| 2,733,995 | Robinson | Feb. 7, 1956 |
| 2,757,737 | Schremp | Aug. 7, 1956 |
| 2,819,239 | Eberhard | Jan. 7, 1958 |
| 2,865,876 | Scott | Dec. 23, 1958 |
| 2,868,753 | Morgan | Jan. 13, 1959 |

FOREIGN PATENTS

| | | |
|---|---|---|
| 562,859 | Great Britain | July 19, 1944 |
| 635,486 | Great Britain | Apr. 12, 1950 |

OTHER REFERENCES

Payne, "Paint, Oil & Chem. Review," October 22, 1953, pages 16, 18, and 44.